United States Patent
Blatter

[11] 3,847,015
[45] Nov. 12, 1974

[54] DISPLACEMENT MEASURING AND RECORDING APPARATUS

[76] Inventor: Albert Joseph Blatter, 14 Kelsey Pl., Bloomfield, Conn. 06095

[22] Filed: Mar. 13, 1972

[21] Appl. No.: 234,286

[52] U.S. Cl. .................................. 73/70, 33/169 R
[51] Int. Cl. ............................................ G01n 29/00
[58] Field of Search .......... 73/70; 33/169 R, 178 F, 33/308, 332

[56] References Cited
UNITED STATES PATENTS
| | | | |
|---|---|---|---|
| 1,905,200 | 4/1933 | Williams | 33/1 H |
| 2,121,614 | 6/1938 | Stark | 33/178 F |
| 3,611,798 | 10/1971 | Scott | 73/88 R |

*Primary Examiner*—Richard C. Queisser
*Assistant Examiner*—Arthur E. Korkosz
*Attorney, Agent, or Firm*—Frederick A. Goettel, Jr.

[57] ABSTRACT

Apparatus for measuring and recording the amplitude of the relative movement between two spatially disposed objects including a spring loaded plunger attached to one object so as to engage and track the movement of the second object. Spring loaded scribes are positioned on the first object to engage the surface of the plunger. The magnitude of relative displacement between the objects is determined by measuring the length of scratch marks impressed on the plunger by the scribes.

5 Claims, 3 Drawing Figures

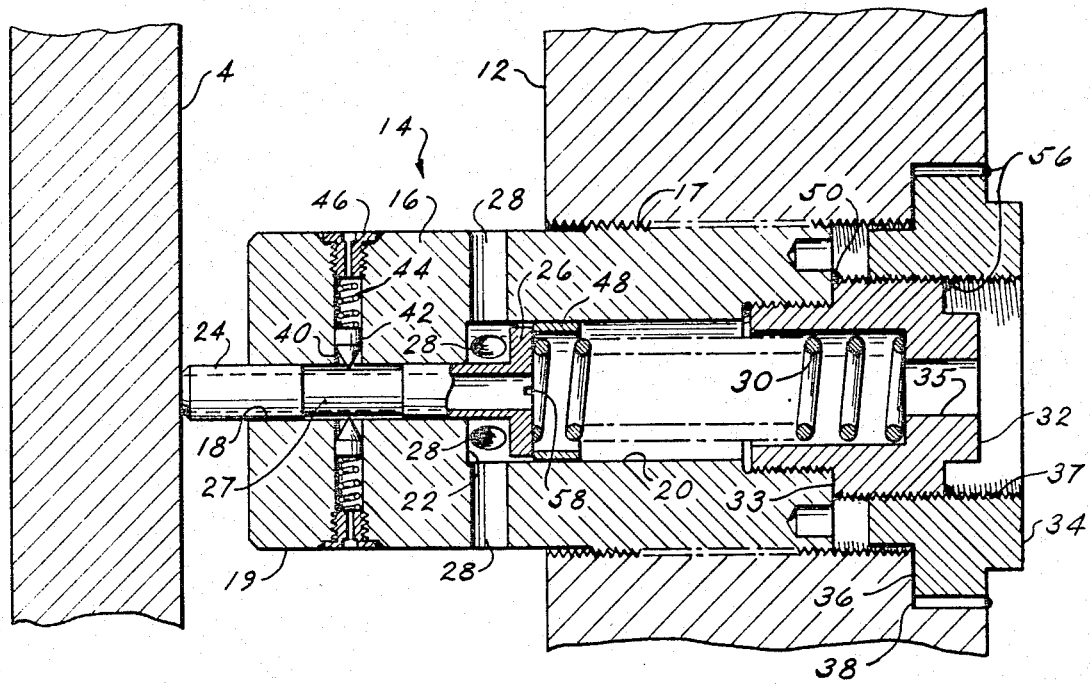
FIG. 2
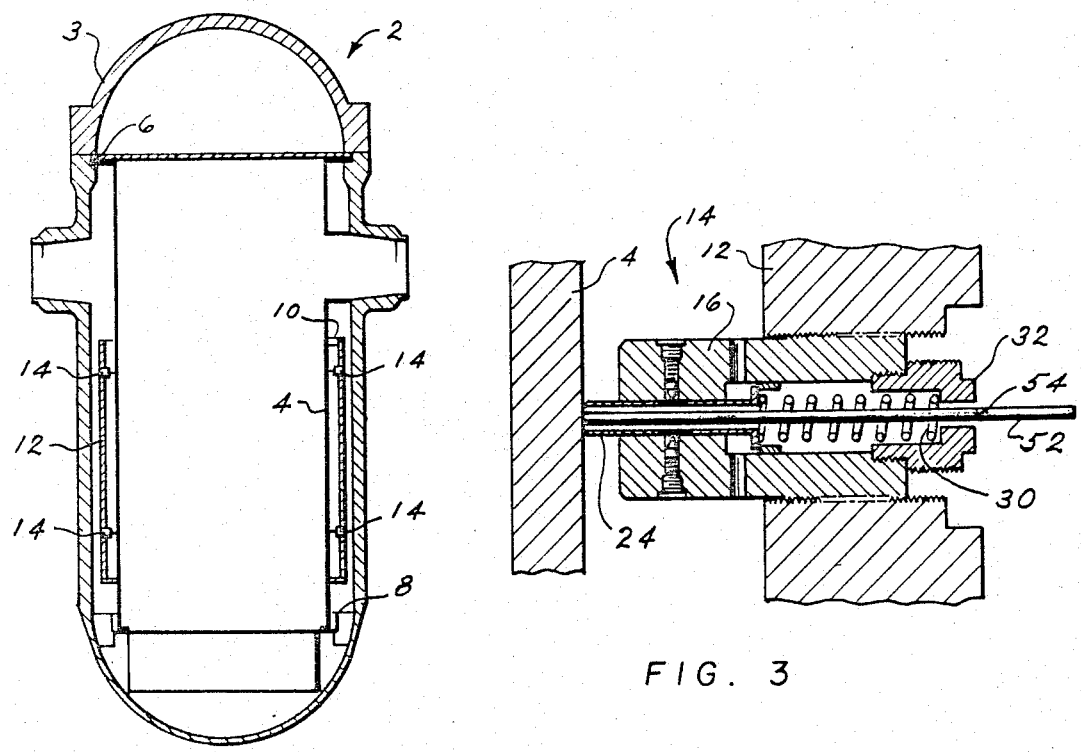
FIG. 1
FIG. 3

DISPLACEMENT MEASURING AND RECORDING APPARATUS

BACKGROUND OF THE INVENTION

1. Field of the Invention

This invention relates to displacement measuring and recording apparatus and more particularly to apparatus for determining the amplitude of the relative radial movement between two concentrically disposed cylinders such as the core support barrel and the thermal shield of a nuclear reactor.

2. Description of the Prior Art

The design of a typical modern pressurized water nuclear reactor includes a cylindrical outer pressure vessel, a cylindrical thermal shield mounted concentrically within the pressure vessel, and a core support barrel which is in turn concentrically disposed within the thermal shield. In such a configuration it is common for the core support barrel to be structurally supported only at its upper end with the thermal shield, which is shorter in length than the barrel, supported from pins on the outer surface of the barrel.

Because of the size of these components it is possible that the flow of coolant within the pressure vessel will induce undesirable vibrations in the structure. The amplitude of such vibrations may be, to some extent, limited by the installation of snubbing devices on the outside of the core support barrel. Due to the complex dynamics of the system, however, it is not known how effective such devices will be until any one system is built and in operation.

The usual approach to determining if such vibrations will present a problem is to measure the amplitude of the relative radial movement between the core support barrel and the thermal shield which occurs during a hot flow test of the reactor coolant loop. Such a test is routinely conducted prior to installation of radioactive core components. In the past such measurements have been made with the use of piezoelectric accelerometers or acoustic transducers attached to the various components of concern. The information from such devices would be transmitted, via electrical leads, to electronic equipment exterior of the reactor where it would be necessary to electronically process it in order to obtain the desired displacement magnitudes.

A major drawback of using accelerometers to make this measurement has been their inherent inaccuracy at low frequency vibrations. In the present application, maximum displacements generally occur at the lowest vibration frequencies. Erroneous displacement readings thus were not uncommon.

A disadvantage of commercially available accelerometers and transducers is their inability to withstand high temperature and pressure operating conditions. The temperature and pressure within the pressure vessel, where these devices must operate, may reach 650°F and 2,500 psi respectively.

Other disadvantages of accelerometers and transducers, in this application, include the need for external connections for remote readout, the need for electronic equipment to process the signals obtained as well as the need for trained personnel to monitor this equipment.

BRIEF SUMMARY OF THE INVENTION

The present invention is directed to a displacement measuring and recording device capable of giving an accurate indication of maximum relative movement between two objects over a wide range of vibration frequencies and while operating in an underwater, high temperature, high pressure environment. A spring loaded follower member is slidably mounted in a housing attached to one object with one end of the follower extending from the housing to engage the second object. A marker or scribe having a pointed end is slidably disposed in the housing generally perpendicular to the follower with the pointed end engaging a side of the follower. A coil spring is provided to positively urge the pointed end against the follower so that a sliding motion of the follower, due to relative movement between the two objects, will result in a scratch mark on the follower equal to the amplitude of the relative movement which has occurred. A removable retaining means on one end of the housing acts as the seat for the follower spring and also facilitates removal of the plunger from the housing to evaluate the test data collected on the follower.

A further feature of the invention involves a friction sleeve mounted within the housing and adapted to be displaced in one direction only by the motion of the follower. Measurement of the displacement of the sleeve from its original position provides an alternate method of determining the maximum half amplitude of the relative motion between the two objects.

It is thus a primary object of this invention to provide a displacement measuring and recording gage which is capable of functioning reliably in an underwater, high temperature, high pressure environment.

A further object of this invention is to provide a device capable of measuring and recording high amplitude vibrational displacements resulting from relatively low frequency vibrations.

It is also an object of this invention to provide a displacement gage that is additionally capable of reliably recording vibrationally excited displacements at relatively high frequency vibrations.

Another object of this invention is to provide a displacement gage which provides a permanent visual indication of maximum displacement amplitudes.

Other objects and advantages of the invention will become apparent upon reading the following detailed description of an illustrative embodiment and upon reference to the drawings.

BRIEF DESCRIPTION OF THE DRAWINGS

FIG. 1 is a schematic vertical arrangement view of a nuclear reactor having the apparatus of the present invention installed thereon.

FIG. 2 is a side sectional view of the displacement indicator.

FIG. 3 is a view similar to FIG. 2, on a reduced scale, with the retainer nut removed and showing means for insuring proper positioning of the indicator relative to the two objects.

DESCRIPTION OF THE PREFERRED EMBODIMENT

Referring first to FIG. 1, there is illustrated a nuclear reactor 2 which includes a reactor vessel 3. Concentrically disposed within the reactor vessel 3 is a core support barrel 4 which is positively attached to the reactor vessel only at its upper end as at 6. Suitable snubbing devices 8 are positioned adjacent the lower end of the barrel 4 to limit vibration, as discussed above. Concentrically mounted by means of pins 10 on the outside surface of the core support barrel 4 is a thermal shield 12. Extending through openings in the thermal shield 12 and contacting the core support barrel 4 are a plurality of displacement indicators 14. These indicators are suitably located around the thermal shield to provide representative indications of displacement occurring between the shield and the core support barrel 4.

Referring now to FIG. 2, there is illustrated in detail one of the displacement indicators 14 mounted in a through opening provided in the thermal shield wall 12 and adapted to engage a section of the concentrically disposed core support barrel 4. The indicator 14 comprises a cylindrical housing 16 which is externally threaded, as at 17, over part of its length for engagement with mating threads provided in the opening in the thermal shield wall 12. When in proper position, the unthreaded portion 19 of the housing extends from the shield wall into the annular space between the two walls. The exact amount by which it extends therein depends on the distance between the walls which may vary slightly from one installation to the next. The housing 16 has an axially extending passageway therethrough defined by a first bore section 18 originating in the end of the housing 19 extending into the annular space between the walls and which terminates in a second larger diameter bore section 20 which extends through the opposite end of the housing. An annular shoulder 22 is defined at the transition between the two different size bores 18, 20. Slidably disposed within both bores 18, 20 of the housing 16 is a vibration follower 24. The follower 24 includes a hollow cylindrical sleeve, the leading end of which extends from bore 18 into the space between the thermal shield 12 and the core support barrel 4. The other end of the follower 24 extends into the second bore 20 and is provided with an enlarged head 26 that engages with the shoulder 22 to prevent its passage from the housing 16 through the first bore 18. The follower 24 is suitably lubricated, as for example by a chrome coating to facilitate sliding within the housing. An intermediate portion 27 which receives the scribe 42, as hereinafter described, is uncoated. A pair of tool engaging indents 58, only one of which is shown, are provided in the interior of the follower on the end provided with the enlarged head. The function of these indents will be subsequently described.

The portion 19 of the housing 16 extending into the space between the barrel and the shield has a series of openings 28 suitably spaced around its circumference interconnecting the interior of the second bore 20 in the general proximity of the shoulder 22, and the exterior of the housing. These openings 28 permit coolant water to flow freely into and out of the housing 16 so that the motion of the follower 24 will not be retarded by the presence of water in the housing when relative movement occurs between the barrel 4 and the shield 12.

A suitably sized coil spring 30 is provided within the second bore section 20 to engage the enlarged head 26 of the follower 24 and to thereby urge the follower to engage and track the motion of the barrel 4. The spring rate of this spring should be such that the natural frequency of the system will be greater than the highest frequency vibration which is expected to occur. The spring 30 is partially compressed and retained within the housing 16 by means of an externally threaded spring seat 32 which engages mating threads provided in the interior of the second bore section 20. The spring seat 32 includes a larger diameter portion which forms a shoulder 33 for engaging the rear end of the housing 16. The larger diameter end is also provided with threads which are adapted to engage interior threads provided on a retainer nut 34 employed to prevent retrograde movement of the indicator when fully assembled. The retainer nut 34 includes an annular shoulder portion 36 adapted to abut a mating shoulder 38 formed by a counter bore in the opening in the thermal shield wall 12. Both the spring seat 32 and the retainer nut 34 contain through openings 35 and 37 to provide an access opening to the interior of the housing when the indicator is fully assembled.

There are provided, adjacent the leading end of the housing 16, in that portion 19 extending into the space between the shield 12 and the barrel 4, two diametrically opposed passageways 40, each opening from the exterior of the housing 16 to the interior of the first bore section 18. Slidably disposed within each passageway is a cylindrically shaped marker or scribe 42 having a pointed end directed toward the interior of the housing 16 for contact with the uncoated portion 27 of the follower member 24. Each scribe 42 is urged into contact with the follower 24 by a coil spring 44 positioned behind the scribe in the passageway 40 and which is placed in partial compression by a spring retainer 46 threadably disposed in the outer end of the passageway. The scribes 42 are preferably made from a material which is harder than that from which the follower member 24 is made. While two scribes are used in the illustrated embodiment to provide a redundant capability, should one scribe fail or jam, it should be understood that one scribe or more than two could be used with satisfactory results.

Disposed within the second bore section 20 of the housing 16 is an annular indicator sleeve 48. The outer periphery of this sleeve frictionally engages the inner surface of the second bore 20 and is positioned so that one end thereof is in engagement with the enlarged end 26 of the follower member 24. The frictional forces between the sleeve 48 and the bore wall 20 are such that relative movement will not occur unless an external force is exerted on the sleeve 48. The sliding motions of the follower member 24 in a direction toward the shield 12 will cause such a movement, the resulting displacement of the sleeve being exactly equal to the displacement of the follower member 24. Measurement of the movement of this sleeve, following the completion of testing and the removal of the gage, provides an alternate indication of maximum displacement as will be further discussed below.

The above-described indicator 14 is assembled and installed as will now herein be described. The leading end of the vibration follower 24 is first inserted into the first bore section 18 of the housing 16 until the enlarged end 26 contacts the shoulder 22. The indicator sleeve 48 is then pressed into frictional engagement with the interior of the second bore 20 and positioned to abut the enlarged end 26 of the follower. The main follower spring 30 is next inserted into the second bore 20 followed by the threaded spring seat 32 which is positioned over the end of the spring extending from the housing 16 and is threadably engaged with the interior of the housing. The seat 32 is threaded into the housing until the exterior shoulder portion 33 of the seat engages the end of the housing 16. When so engaged the spring 30 is in a state of partial compression. A lock weld 50 is then made between the seat 32 and the housing 16 to insure that no change in position occurs therebetween during testing. The two sets of point scribes 42, scribe springs 44 and scribe spring retainers 46 are now appropriately installed in the passageways 40 provided in the indicator housing 16.

The partially assembled indicator 14 is then passed through the opening provided in the shield wall 12 and is threadably engaged with the opening until the follower 24 engages the barrel wall 4 and is pushed into the housing to further compress the follower spring 30. It is desirable that the relative position of the follower 24 and the scribes 42 be such that the scribe point is centrally located in the region 27 of the follower 24 not having a protective coating. When such a relation exists the enlarged end 26 of the follower 24 is sufficiently spaced from the shoulder 22 to permit the follower 24 to track and record motion of the barrel 4 on both sides of its at rest position. Referring to FIG. 2, such a relation is achieved by inserting a long cylindrical tool 52 into the housing 16 and through the hollow core of the follower 24 to contact the barrel wall 4. This tool 52 is provided with a suitable scratch mark 54 which when in alignment with the outer end of the spring seat 32 indicates that the housing 16, and hence the follower 24, are in the correct position. The housing 16 thus is rotated to bring the end of the seat 32 into alignment with this mark. When this is achieved the tool 52 is removed and the retainer nut 34 threaded onto the end of the spring seat 32 until the shoulder 36 solidly engages the corresponding shoulder 38 in the thermal shield 12. Such an arrangement tends to place a load on all threaded connections reducing the probability of relative motion occurring between the mating parts. To further insure that no relative motion occurs between elements during the test, lock welds 56 are placed as indicated to connect the seat 32 to the retainer nut 34, and the retainer nut 34 to the housing 16.

While in this position, relative motion between the barrel 4 and the shield 12 will result in a corresponding motion of the follower 24. The scribes 42, in turn, will make longitudinal scratch marks on the unprotected region 27 of follower 24 equal in length to the maximum amplitude of the displacement. When the testing sequence is completed the followers 24 must be removed from the housing 16 to measure and evaluate the recorded data. As indicated above, the evaluation involves simply measuring the length of the scratch marks, this length being equal to the maximum relative displacement occurring between the barrel 4 and the shield 12. Furthermore, by measuring the displacement of the indicator sleeve 48 from its original position (i.e., the position it was in after the indicator was fully installed), an alternate reading of the displacement of the two objects from their at rest position toward one another is available.

If it is desired to know the exact magnitude of the maximum displacement which occurs on either side of the datum or at rest position, a circumferential datum scratch mark may be made on the follower 24 after the gage is installed but before testing begins. This mark is made by inserting a screwdriver type tool into the indicator to engage the indents 58 provided in the end of the follower 24. Several rotations of the follower 24 with the tool will result in the desired mark. Measurement of the length of the scratch on one or the other side of this mark will provide the information desired.

While a preferred embodiment of the invention has been shown and described, it is to be understood that such showing is merely illustrative and that changes may be made without departing from the spirit and scope of the invention as claimed.

What is claimed is:

1. Apparatus for measuring and recording the amplitude of the relative movement between a first object and a second object spatially disposed with respect to the first object comprising:
    a. a housing attached to said first object and having a continuous passage therethrough defined by a first bore section and a second bore section larger in cross section than said first bore section, the transition between said first and second bores defining a shoulder interior of said housing, said housing having a second passageway generally perpendicular to said first passageway and extending from an outside wall thereof to the interior of said first bore section;
    b. a follower member slidably positioned in and extending through said first bore section, said follower having a first end extending from said housing to engage said second object, the other end of said follower terminating within said second bore section and having an enlarged portion thereof to engage said shoulder;
    c. a first spring means disposed within said second bore section and engaging said enlarged portion of said follower member for urging said follower into engagement with said second object;
    d. removable retaining means disposed in the end of said housing containing said second bore section to confine said first spring means within said bore;
    e. scribe means slidably positioned within said second passageway having a pointed end directed toward the interior of said housing to engage a side of said follower member, said means being made from a material harder than that from which said follower is made; and
    f. a second spring means disposed within said second passageway for urging the pointed end of said marker into engagement with said follower.

2. The apparatus of claim 1 including an indicator sleeve disposed within said second bore in abutting relation to said enlarged portion of said follower member, said indicator having an external diameter of a size to frictionally engage said second bore and being longitudinally movable within said bore in response to movement of said follower member an amount corresponding to that of said follower member.

3. The apparatus of claim 1 wherein when said follower member is engaged for movement in unison with said second object said first spring means is partially compressed and said enlarged portion of said follower is spaced from said shoulder a distance equal to at least one-half of the amplitude of the displacement expected to occur between the objects.

4. The apparatus of claim 1 including means for allowing the passage of water into and out of said housing, said means comprising at least one passageway in said housing extending from the interior of said second bore, adjacent said shoulder, to the exterior of said housing.

5. The apparatus of claim 1 wherein the relative movement occurring between said first and second objects is vibrationally induced and wherein the spring rate of said first spring means is selected such that the natural frequency of the system comprising the follower and first spring means is greater than the highest frequency vibration which is expected to occur in the two objects.

* * * * *